(12) United States Patent
Goldsmith

(10) Patent No.: US 6,781,722 B1
(45) Date of Patent: Aug. 24, 2004

(54) METHOD OF MINIMIZING FACSIMILE IMAGE CORRUPTION IN CDMA SYSTEMS

(75) Inventor: Eric Steven Goldsmith, Weatherford, TX (US)

(73) Assignee: Motorola, Inc., Schaumburg, IL (US)

( * ) Notice: Subject to any disclaimer, the term of this patent is extended or adjusted under 35 U.S.C. 154(b) by 889 days.

(21) Appl. No.: 09/675,996

(22) Filed: Sep. 29, 2000

(51) Int. Cl.[7] .............................. H04N 1/00; H04B 3/08
(52) U.S. Cl. ..................... 358/437; 455/557; 455/426.1
(58) Field of Search ............................. 358/400, 405, 358/407, 437, 426.08, 426.15; 379/102.01, 102.02, 102.03; 455/426.1, 422.01, 434, 464, 67.11, 63.1, 67.13, 554.2, 557

(56) References Cited

U.S. PATENT DOCUMENTS 5,937,050 A * 8/1999 Yue .............................. 379/210
6,032,049 A * 2/2000 Izumi ........................... 455/509
6,052,593 A * 4/2000 Guimont ....................... 455/446

* cited by examiner

*Primary Examiner*—Jerome Grant, II
(74) *Attorney, Agent, or Firm*—Charles W. Bethards

(57) ABSTRACT

The present invention is for transmitting facsimile data over a wireless interface in a manner that minimizes the occurrence of time outs caused by wireless interface data corruption. Facsimile data to be transmitted over a wireless interface is collected and then transmitted using a wireless error detecting and correcting protocol (76). The facsimile data is re-transmitted if the data transmission is unsuccessful until the transmitting of the facsimile data is successful. Highly correlated lines in the collected facsimile data are identified if delays caused by the re-transmitting of the collected facsimile data reach a predetermined limit, and certain ones of the highly correlated lines that have a minimal impact on received facsimile data are then deleted to prevent a facsimile protocol time out (84).

17 Claims, 4 Drawing Sheets

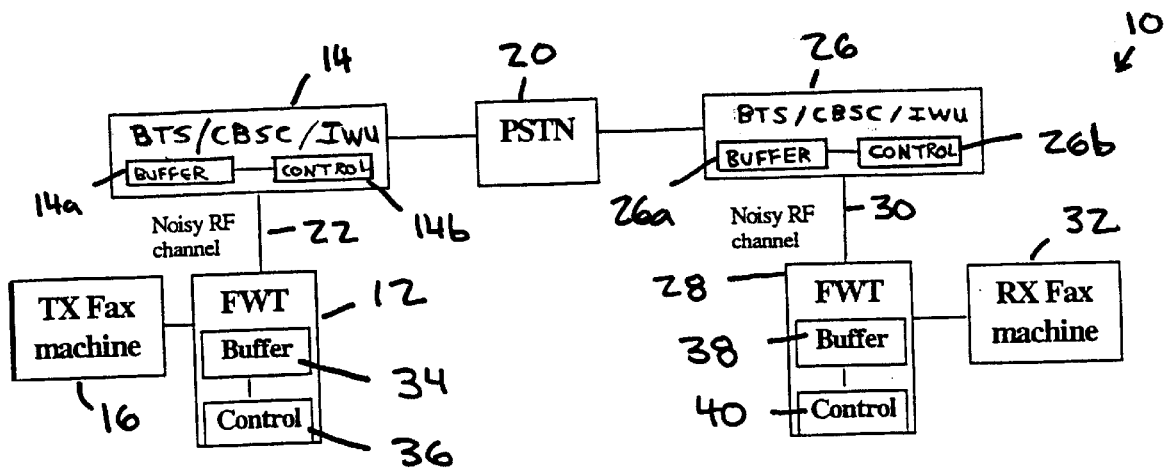
FIG. 1
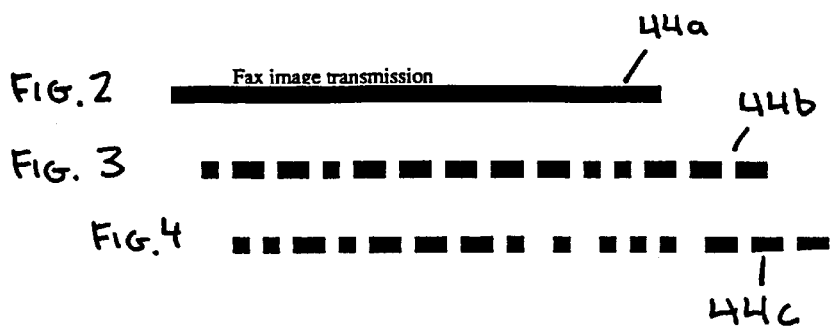
FIG. 2
FIG. 3
FIG. 4

METHOD OF MINIMIZING FACSIMILE IMAGE CORRUPTION IN CDMA SYSTEMS

FIELD OF THE INVENTION

The present invention relates generally to wireless telecommunications networks, and more particularly to the minimization of facsimile image corruption in wireless networks due to channel delays.

BACKGROUND OF THE INVENTION

Transmitting facsimile image data over wireless communication links such as CDMA links is now commonplace. When this type of data is sent over a noisy transmission channel, such as a CDMA channel with a high frame erasure rate (FER), air interface protocols, such as TCP/IP/PPP protocols, will cause data frames transmitted from a transmit side facsimile machine and not received by a receive side facsimile machine to be re-transmitted. Such data re-transmission inherently delays the transmission of subsequent data frames. If the cumulative delay caused by such re-transmissions becomes too large, the resulting time shift between the transmit and receive side facsimile machines will cause the transmit side machine to time out, disconnect the call, and report a transmission error.

One conventional solution to prevent a transmitting facsimile machine from timing out based on the above-described situation is to delete a predetermined number of lines from a queue associated with the transmitting facsimile machine, such as a transmission queue in a transmit side inter-working unit (IWU), with the predetermined number of lines being estimated to compensate for the time delay. However, the time shift in such an approach can only be estimated based on the number of data frames that have been re-transmitted. This is because the processing mechanism, which is typically either a base transceiver site, a fixed wireless terminal (FWT) or a central base site controller (CSBC), responsible for determining the estimated delay cannot determine the length of other system delays, as it has no way of determining whether the facsimile transmission link is a mobile-to-land, land-to-mobile or mobile-to-mobile link. In addition, the re-transmission delay could be longer than a delay corresponding to the total number of data lines capable of being stored in the transmission queue.

For example, in a mobile-to-mobile call in which the FER at the receive side facsimile machine is the dominant delay factor, the system infrastructure executes the majority of re-transmissions and therefore the facsimile scan lines must be deleted at the infrastructure queue (in the IWU). However, in a mobile-to-land call, the infrastructure queue is not a factor, as there is no air interface to cause the infrastructure queue to become congested. Therefore, in a mobile-to-land call, the mobile (FWT) is the only device capable of decreasing the time delay.

Each IWU and FWT can act autonomously based on their own time delay perspective in all types of calls, such as mobile-to-mobile, land-to-mobile, and mobile-to-land calls. Techniques in which blank lines are inserted and deleted to compensate for timing delays at the transmitting facsimile machine are known. However, if data being transmitted consists of a document having no blank lines, no compensation for timing delays would occur, therefore potentially causing the sending facsimile machine to time out and disconnect the call.

BRIEF DESCRIPTION OF THE DRAWINGS

Additional advantages of the present invention will be more readily apparent from the following detailed description of preferred embodiments thereof when taken together with the accompanying drawings in which:

FIG. 1 is a block diagram of a first cellular communications system over which two fax machines communicate utilizing a method of minimizing facsimile image corruption in accordance with a first preferred embodiment of the present invention;

FIGS. 2–4 are diagrams of a line of transmitted facsimile image data from both transmitting and receiving perspectives;

DETAILED DESCRIPTION OF THE PREFERRED EMBODIMENTS

Figure 5:
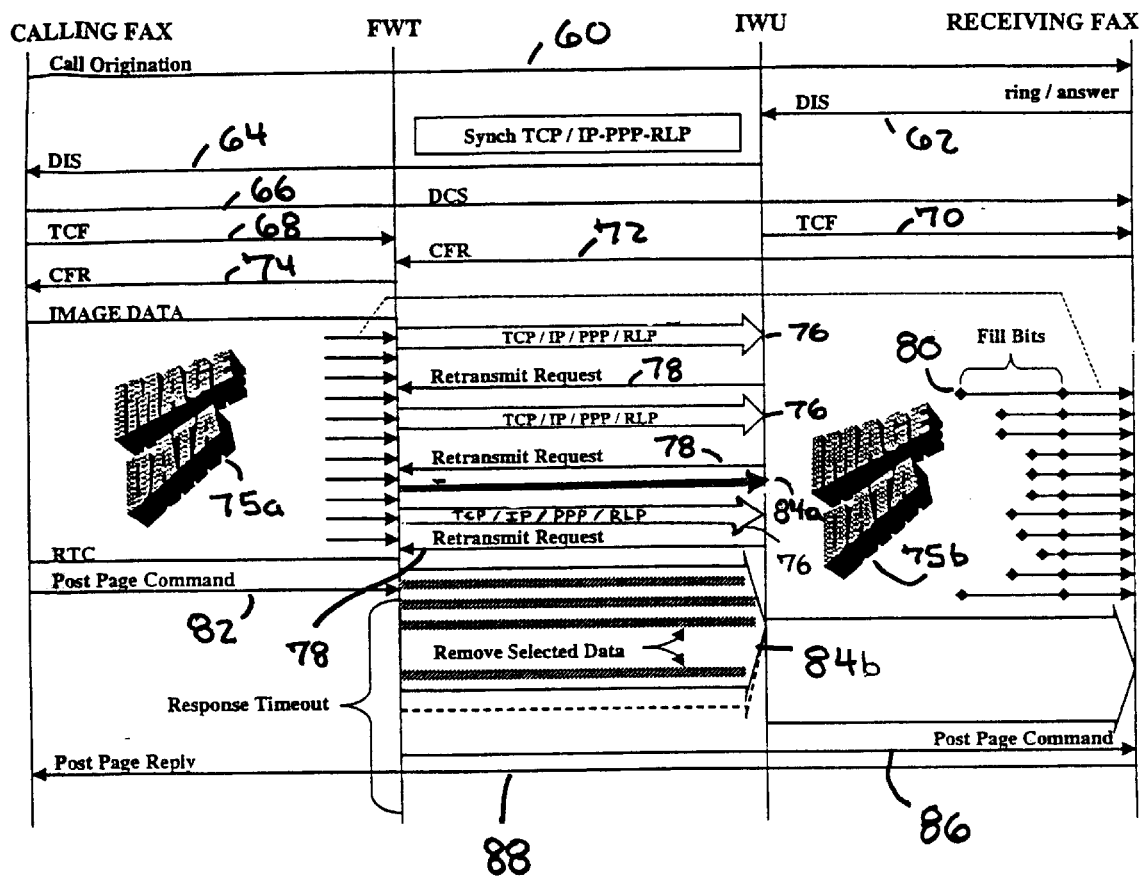
FIG. 5 is a timing sequence diagram illustrating the results of implementation of the method of minimizing facsimile image corruption in accordance with a second preferred embodiment of the present invention.

Referring now to the drawings in which like numerals reference like parts, FIG. 1 shows a mobile-to-mobile communications system 10 of a first embodiment in accordance with the present invention, such as a code division multiple access (CDMA) or time division multiple access (TDMA) wireless local loop. The system 10 includes a transmit side fixed wireless terminal (FWT) 12 and a transmit side base station 14, which is a base transceiving station (BTS), a central base station controller (CSBC) to which several BTSs within a given geographical area are connected, and an inter-working unit (IWU), including a buffer 14a and a controller 14b, for re-formatting received mobile facsimile data for landline transmission. Together, the transmit side FWT 12 and base station 14 connect a transmit side facsimile machine 16 to a publicly switched telephone network (PSTN) 20.

The transmit side FWT 12 is for transmitting radio frequency (RF) signals containing lines of facsimile image data over a dedicated RF channel 22 to the transmit side base station 14, and is typically mounted in a convenient location in a building or home so that it remains fixed in relation to the location of base station 14. The RF signals transmitted over the channel 22 conform to an air interface standard, such as the industry standard IS-95 for CDMA cellular communications systems. The transmit side base station 14 is for communicating facsimile image data received from the FWT 12 to the public switched telephone network 20 so that customers using the transmit side facsimile machine 16 may communicate with other facsimile machines (not shown) connected to the PSTN 20.

The system 10 also includes a receive side base station 26 which, like the transmit side base station 14, includes a BTS, a CSBC and an IWU, with the IWU including a buffer 26a and a controller 26b. The base station 26 communicates with a receive side FWT 28 over a dedicated RF channel 30 that is independent from the transmit side RF channel 22 to pass lines of facsimile image data from the transmit side facsimile machine 16 to a receive side facsimile machine 32.

Referring now specifically to the FWTs 12, 28, the transmit side FWT 12 includes both a buffer 34 and a controller 36. The buffer 34 is for receiving lines of facsimile data from the transmit side facsimile machine 16 that are to be transmitted to the receive side facsimile machine 32, and for queuing the received lines in the order in which the lines are received from the transmit side facsimile machine 16. The controller 36 is programmed to drop lines queued in the buffer before the lines are transmitted to the receive side FWT 28 to compensate for delays caused by noise or other forms of data corruption such as interference on RF channel 22. In accordance with the present invention, the controller 36 is programmed to locate adjacent lines queued in the buffer 34 that are highly correlated or, in other words, that have data that is identical or nearly identical, so that removal of one or more of the highly correlated lines would minimally affect the image output at the receive side facsimile machine 32, and at most would only result in slight vertical compression of the output image.

In the receive side FWT 28, the buffer 38 is for receiving the lines of facsimile data transmitted by the FWT 12 from the buffer 34 through the base station 14, across the PSTN 20 and through the base station 26, and for queuing the lines of data in the order in which the lines are received. The controller 40 is for controlling transmission of the lines of queued facsimile data from the buffer 38 to the receive side facsimile machine 32.

It should be noted that, in a mobile-to-mobile system such as the system 10, the receive side base station 26 is also a transmit device relative to the receive side FWT 28 and facsimile machine 32. Therefore, the IWU in the base station 26 may also be programmed in a manner similar to the transmit side FWT 12 to delete highly correlated lines from the lines of facsimile data received from the transmit side FWT 12 to compensate for delays caused by noise or other forms of data corruption such as interference on RF channel 30.

In operation, when facsimile data is sent over the channels 22, 30, and one or both of the channels 22, 30 is noisy or, more specifically with reference to a CDMA system, has a high frame erasure rate (FER), associated air interface protocols such as TCP/IP or PPP protocols must dedicate a significant amount of time re-transmitting frames of facsimile data that the receive side FWT 28 does not acknowledge receiving. Each re-transmission delays the transmission of subsequent facsimile data lines by the FWT 12. When the cumulative total of such re-transmission delays becomes too large, the resulting difference in time from when the transmit side facsimile machine 16 transmits a post page command to when the receive side facsimile machine 32 receives the post page command and sends a post page reply will cause the transmit side facsimile machine 16 to time out while waiting for the receive side facsimile machine 32 to reply. As a result of such a time out, the transmit side facsimile machine 16 will disconnect the call and report a transmission error.

Referring now to FIGS. 2–4, an exemplary line of facsimile data is shown from the perspectives of different components in the system 10 to illustrate the time delays introduced as a result of data re-transmissions caused by channel corruption. FIG. 2 shows an exemplary transmitted line of facsimile data at 44a as transmitted from the transmit side facsimile machine 16. As shown, the line is solid black, indicating that no data corruption exists. FIG. 3 shows the same line of data at 44b after the data is transmitted across the RF channel 22. The gaps represent the time spent re-transmitting data that was corrupted by noise on the RF channel 22. FIG. 4 shows the same line of data at 44c after additional corruption is introduced due to transmission across the RF channel 30.

As is evident from the above figures, the receive side facsimile machine 32 can finish receiving the complete image well after the transmit side facsimile machine has finished sending it, with the resulting time delay varying based on factors such as FER and the total time required to transmit a given page, with the latter depending upon both image complexity and the bit rate of the transmit side facsimile machine 16. For example, a complex image sent at 7200 bps will require about 2 minutes, or 6000 CDMA frames to send. If the associated FER for channel 22 or channel 30 is 2.5%, 150 frames would have to be re-transmitted, therefore causing a time shift of about 3 seconds when transmission delays due to other factors, such as inherent TCP/IP/PPP protocol stack, TCP/IP/PPP re-transmission and IWU-related delays, are not considered. The total delay when all factors are considered has been found to nearly double when a call is placed in a mobile-to-mobile environment such as that illustrated in FIG. 1, assuming that both of the FWTs 12, 28 operate in similar high FER environments. In such an environment, a time delay of, for example, 7 seconds could occur. In addition, other delays, such as delays due to the T.30 message preamble (1 second of HDLC flags), delays caused by re-transmission of the T.30 message when the receive side FWT 12 does not correctly receive the T.30 message (typically about 3 seconds), and hold-off timer delays and collision avoidance delays associated with the half-duplex facsimile protocol (typically about 2 seconds), are also possible. Therefore, the transmit side facsimile machine 32 will typically expect an acknowledgement from the receive side facsimile machine 16 within about 9 seconds. If it does not receive the acknowledgement within this time period, the transmit side facsimile machine will time out and disconnect the call.

Figure 6:
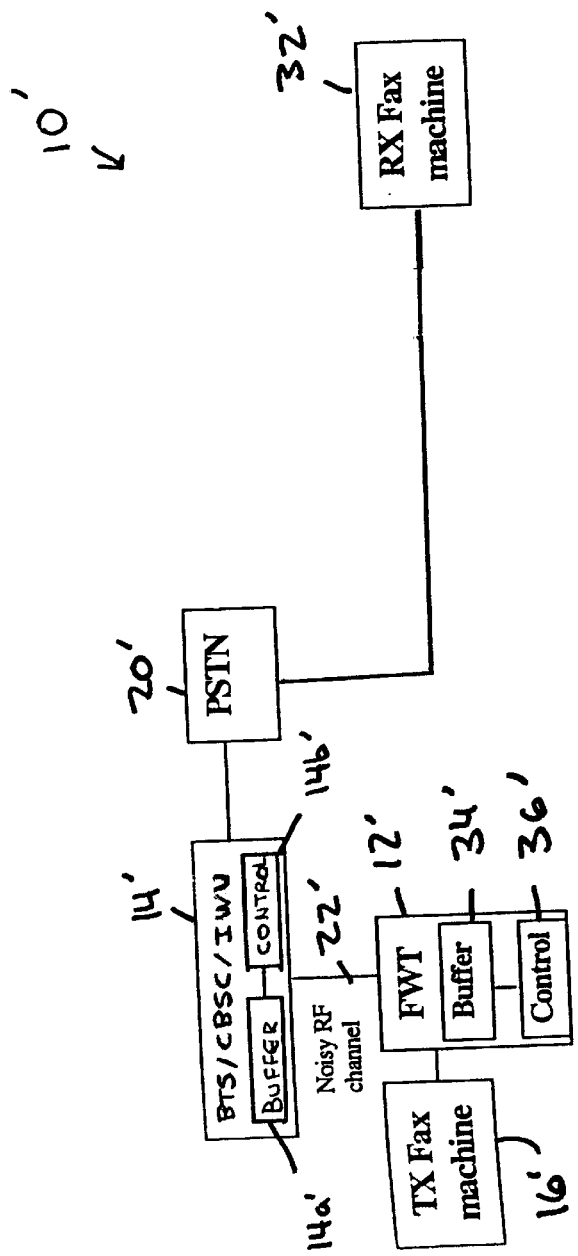
FIG. 6 is a block diagram of a second cellular communications system over which two fax machines communicate utilizing a method of minimizing facsimile image corruption in accordance with a second preferred embodiment of the present invention.

Referring now to FIGS. 5 and 6, minimization of facsimile data corruption as realized by an embodiment in accordance with the present invention will now be discussed in detail. Specifically, the following discussion will focus on how a facsimile message is transmitted in a mobile-to-landline type system, such as the CDMA system 10' shown in FIG. 6.

At 60, the transmit side facsimile machine 16' connects to the transmit side FWT 12', which connects to the IWu 14', which in turn connects to the receive side facsimile machine 32' through the PSTN 20'. At 62–74, T.30 messages, including DIS, DCS and CFR messages, are transmitted between the transmit and receive side facsimile machines 16', 32' to establish a facsimile communication link, pursuant to conventional wireline facsimile transmission protocol. The DIS and DCS messages at 62–66 are used for stating the capabilities of the machines 16', 32', such as which speeds are supported, which (if any) compression schemes are supported, and the like. The TCF message at 68–70 is actually not a message but rather is a carrier burst used for testing the quality of the phone lines to be used in the communication prior to transmission of the facsimile data. If the phone lines have acceptable amounts of noise, the receive side facsimile machine 32' will send a CFR message at 72 to cause the transmit side facsimile machine 16' to initiate data transmission.

Subsequently, image data such as the exemplary image data shown at 75a sent from the transmit side facsimile machine 16' is queued in the buffer 34' of the transmit side FWT 12' on a line-by-line basis, and at 76 is then sent across the RF channel 22' to the IWU 14' using protocols such as TCP/IP/PPP/RLP. As shown at 78, the IWU 14' then requests re-transmission of facsimile data that has been corrupted due to transmission across the RF channel 22'.

If the RF channel 22' is noisy, at 80 the IWU 14' sends fill bits to the receive side facsimile machine 32' when the IWU becomes starved for data to be transmitted to the receive side facsimile machine 32' due to the re-transmission delays. The varying number of fill bits per line shown at 80 represents varying amounts of time spent waiting for additional data due to re-transmissions. The time spent re-transmitting data causes the transmission delay to increase. However, the transmit side controller 36', programmed in accordance with the present invention, examines the lines of facsimile data queued in the buffer 34' and identifies highly correlated lines that could be deleted with minimal or no resulting impact on the quality of the transmitted image 75b. The FWT 12' can delete identified highly correlated lines at, for example, 84a prior to receiving a post page command by estimating time delays due to re-transmission as the delays are encountered. Alternatively, the identified highly correlated lines can be deleted at 84b after the transmit side FWT 12' receives a post page command at 82 from the transmit side facsimile machine 16' indicating that all lines of data of the image to be transmitted have been transferred to the transmit side FWT 12'. The transmit side FWT 12' then forwards the post page command to the receive side facsimile machine 32' at 86 to indicate the end of that page of image data, and at 88 the receive side facsimile machine 32' then transmits an acknowledging post page reply to complete the transmission.

Figure 7:
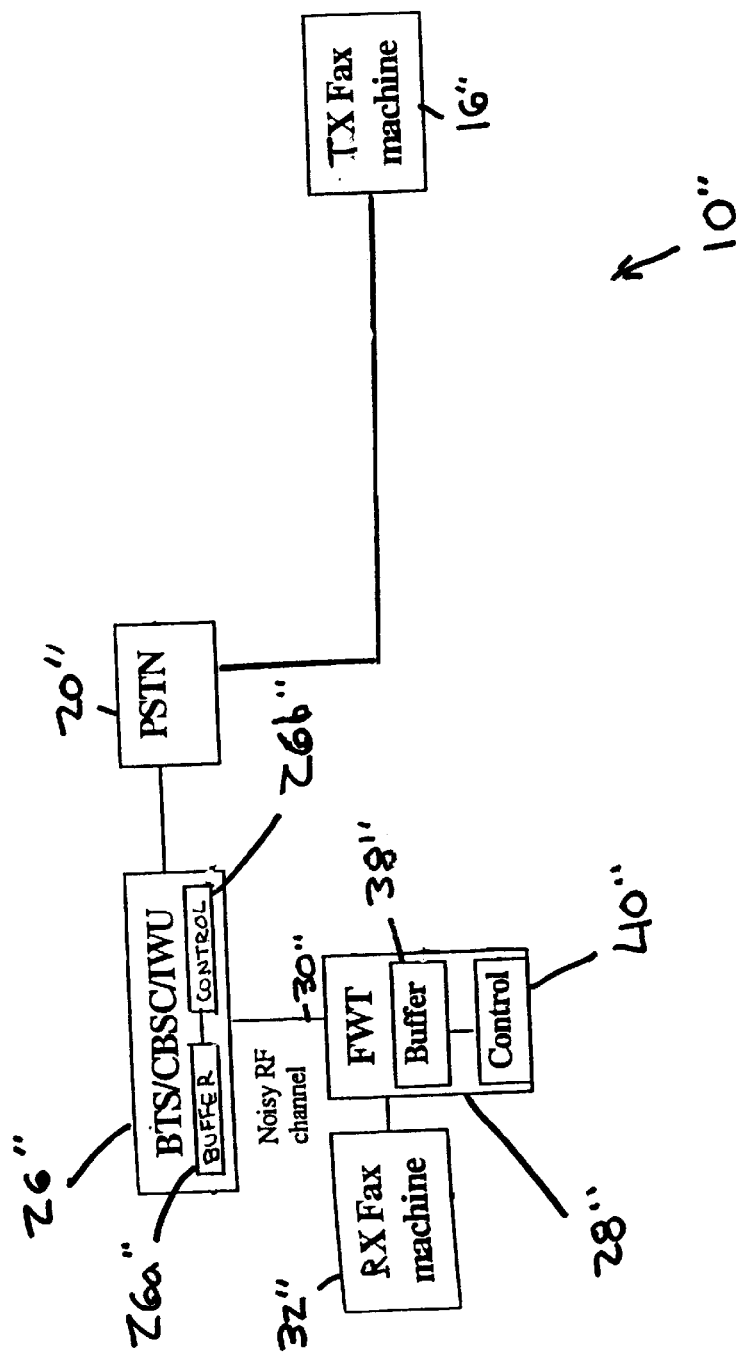
FIG. 7 is a block diagram of a third cellular communications system over which two fax machines communicate utilizing a method of minimizing facsimile image corruption in accordance with a third preferred embodiment of the present invention.

While the above example of a technique for minimizing facsimile data corruption was given in the context of a mobile-to-landline type system, it should be appreciated that the same basic technique is also applicable to a mobile-to-mobile type system such as the system 10 shown in FIG. 1, a landline-to-mobile type system such as the system 10" shown in FIG. 7, and any other system in which facsimile data is transmitted over at least one mobile channel.

It should be noted that the above-described wireless local loops utilizing FWTs to connect facsimile machines to the PSTN provide an ideal solution to system designers facing the problem of how to minimize the number of cell sites in a system. Therefore, the present invention finds particular utility in cellular systems implemented in economically developing countries where cellular infrastructure buildout is not cost-effective. In such countries' implementation, wireless local loops incorporating the facsimile image implementation, wireless local loops incorporating the facsimile image corruption technique of the present invention along with FWTs that perform well in high FER environments, such as those that are typical at the fringes of communications cells, would provide system users with quality facsimile transmission and reception capabilities.

In addition, while the above embodiments in accordance with the present invention compensate for transmission delays in wireless local loops utilizing channels, such as RF channels, to communicate facsimile image data, it is also contemplated that the present invention may also be implemented in facsimile transmission systems in which the internet is used as the transmission channel to compensate for internet-related transmission delays.

While the above description is of the preferred embodiment of the present invention, it should be appreciated that the invention may be modified, altered, or varied without deviating from the scope and fair meaning of the following claims.

What is claimed is:

1. A method of transmitting facsimile data, comprising:
   collecting facsimile data to be transmitted over a wireless interface;
   transmitting the collected facsimile data over the wireless interface using an error detecting and correcting protocol;
   re-transmitting the collected facsimile data if the transmitting of the collected facsimile data is unsuccessful until the transmitting of the collected facsimile data is successful;
   identifying highly correlated lines in the collected facsimile data if delays caused by the re-transmitting of the collected facsimile data reach a predetermined limit; and
   deleting certain ones of the highly correlated lines that have a minimal impact on a received facsimile image formed from the collected facsimile data to prevent a facsimile protocol time out.

2. The method of claim 1, wherein the collecting of facsimile data to be transmitted over a wireless interface comprises queuing facsimile data at a fixed wireless terminal.

3. The method of claim 2, wherein the identifying of highly correlated lines in the collected facsimile data and the deleting of certain ones of the highly correlated lines that have a minimal impact on a received facsimile image are executed at the fixed wireless terminal.

4. The method of claim 1, wherein the collecting of facsimile data to be transmitted over a wireless interface is performed at an inter-working unit.

5. The method of claim 4, wherein the identifying of highly correlated lines in the collected facsimile data and the deleting of certain ones of the highly correlated lines that have a minimal impact on a received facsimile image are executed at the inter-working unit.

6. The method of claim 1, wherein the deleting of certain ones of the highly correlated lines that have a minimal impact on a received facsimile image comprises deleting certain ones of the highly correlated lines of the received facsimile data to compress the received facsimile image.

7. The method of claim 1, wherein the collecting of facsimile data to be transmitted over a wireless interface comprises collecting facsimile data to be transmitted over a CDMA interface, and wherein the transmitting of the collected facsimile data using an error detecting and correcting protocol comprises transmitting the collected facsimile data using one of TCP and PPP transmission protocols.

8. A wireless link facsimile transmission system, comprising:
   a fixed wireless terminal for collecting facsimile data to be transmitted from a transmit side facsimile machine;
   said fixed wireless terminal further including:
   a transmitter for transmitting said facsimile data through a transmit side RF channel to a transmit side base station, and thus to a receive side facsimile machine; and
   a controller for identifying highly correlated lines in the collected facsimile data if delays caused by re-transmitting the collected facsimile data due to transmit side RF channel corruption reach a predetermined limit, and for deleting certain ones of the highly correlated lines that have a minimal impact on a facsimile image output by the receive side facsimile machine to prevent a facsimile protocol time out due to re-transmissions resulting from the transmit side RF channel corruption.

9. The wireless link facsimile transmission system of claim 8, further comprising:
   the transmit side base station coupled to a receive side base station that receives the facsimile data transmitted from the transmitter and the transmit side base station; and a receive side fixed wireless terminal connected to the receive side base station via a receive side RF channel for passing the facsimile data from the receive side base station to the receive side facsimile machine.

10. The wireless link facsimile transmission system of claim 9, wherein the receive side base station is further for identifying highly correlated lines in the collected facsimile data if delays caused by re-transmitting the collected facsimile data due to receive side RF channel corruption reach a predetermined limit, and for deleting certain ones of the highly correlated lines that have a minimal impact on a facsimile image output by the receive side facsimile machine to prevent the facsimile protocol time out due to retransmissions resulting from the receive side RF channel corruption.

11. The wireless link facsimile transmission system of claim 9, wherein the transmit and receive side RF channels are independent from one another.

12. The wireless link facsimile transmission system of claim 9, wherein the receive side base station is at least one of a base transceiver site, a central base station controller, and an inter-working unit.

13. The wireless link facsimile transmission system of claim 8, wherein the transmit side base station is at least one of a base transceiver site, a central base station controller, and an inter-working unit.

14. The wireless link facsimile transmission system of claim 8, wherein the transmit side channel is for transmitting the collected facsimile data using one of TCP and PPP protocols.

15. The wireless link facsimile transmission system of claim 8, wherein the transmit side RF channel is one of a CDMA and TDMA channel.

16. A wireless link facsimile transmission system, comprising:
   a transmit side facsimile machine connected to a public switched telephone network;
   a receive side base station for receiving facsimile data transmitted over the public switched telephone network from the transmit side facsimile machine;
   a fixed wireless terminal connected to the receive side base station through an RF channel link for passing the facsimile data received at the receive side base station to a receive side facsimile machine;
   wherein the receive side base station is for identifying highly correlated lines in the collected facsimile data if delays caused by re-transmitting the collected facsimile data due to RF channel link corruption reach a predetermined limit, and for deleting certain ones of the highly correlated lines that have a minimal impact on facsimile data received by the receive side facsimile machine to prevent a facsimile protocol time out due to re-transmissions resulting from the RF channel link corruption.

17. The wireless link facsimile transmission system of claim 16, wherein the receive side base station comprises one of a base transceiver site, a central base station controller and an inter-working unit.

\* \* \* \* \*